US012276130B2

(12) United States Patent
L'Hoest et al.

(10) Patent No.: US 12,276,130 B2
(45) Date of Patent: Apr. 15, 2025

(54) AUTONOMOUS DISPENSING DEVICE

(71) Applicant: IOTCO, Liège (BE)

(72) Inventors: Pierre L'Hoest, Liège (BE); Sébastien Dawans, Liège (BE)

(73) Assignee: IOTCO, Liege (BE)

( * ) Notice: Subject to any disclaimer, the term of this patent is extended or adjusted under 35 U.S.C. 154(b) by 587 days.

(21) Appl. No.: 17/666,821

(22) Filed: Feb. 8, 2022

(65) Prior Publication Data

US 2023/0250660 A1    Aug. 10, 2023

(51) Int. Cl.
| | |
|---|---|
| *E04H 4/12* | (2006.01) |
| *C02F 1/68* | (2023.01) |
| *C02F 103/42* | (2006.01) |
| *G05D 9/12* | (2006.01) |

(52) U.S. Cl.
CPC .......... *E04H 4/1281* (2013.01); *C02F 1/688* (2013.01); *E04H 4/1209* (2013.01); *G05D 9/12* (2013.01); *C02F 2103/42* (2013.01)

(58) Field of Classification Search
CPC ..... E04H 4/1281; E04H 4/1209; C02F 1/688; C02F 2103/42; C02F 2201/009; C02F 2209/008; C02F 2209/02; C02F 2209/04; C02F 2209/06; C02F 2209/40; C02F 2303/04; C02F 1/76; G05D 9/12

USPC ............................................ 210/85
See application file for complete search history.

(56) References Cited

U.S. PATENT DOCUMENTS

| | | | | |
|---|---|---|---|---|
| 5,810,043 | A | * | 9/1998 | Grenier ................. C02F 1/4606 422/264 |
| 2005/0067300 | A1 | * | 3/2005 | Tremblay ............ C02F 1/46104 422/23 |
| 2022/0396503 | A1 | * | 12/2022 | Rau ........................... C02F 1/20 |

* cited by examiner

*Primary Examiner* — Ekandra S. Miller-Cruz
(74) *Attorney, Agent, or Firm* — MaxGoLaw PLLC (57) ABSTRACT

A floating and energy-autonomous device (1) configured to dispense a solid compound (2) into a volume (3v) of liquid. The device (1) includes a reservoir (9) of solid compound (2), and a pump (13) configured to generate a circulating flow of the liquid (3) coining from the volume (3v) of liquid and passing through the reservoir (9) before returning to the volume (3v) of liquid. The device (1) includes a sensor (17) configured to generate a sensor signal indicative of a parameter of the volume (3v) of liquid or of a gaseous environment (4) of the device (1), and/or an antenna (18) configured to receive a radio signal, and to generate an antenna signal. The device (1) includes a microcontroller (19) configured to command the pump (13) and to regulate the circulating flow rate of the liquid (3) on the basis of the sensor signal and/or of the antenna signal.

20 Claims, 4 Drawing Sheets

AUTONOMOUS DISPENSING DEVICE

TECHNICAL FIELD

The invention relates to a floating and energy-autonomous device which is configured to dispense a solid compound into a volume of liquid, for example chlorine pellets into the bathing water of a swimming pool. The device comprises a circuit for circulating the liquid, comprising a reservoir able to contain a reserve of solid compound, the liquid circulation circuit being configured to dissolve the reserve of solid compound and inject a flow of dissolved solid compound into the volume of liquid.

PRIOR ART

Document FR3091700A1 discloses a device for dispensing liquid chlorine into swimming pool water, comprising a reservoir containing the chlorine, a chlorine distribution pump, an electronic control board which manages the flow rate of the distribution pump via a suitable program, the program being initially parameterized for all the degrees of pollution and use universally predefined and corresponding to the different uses encountered with swimming pool water. The dispensing device disclosed in document FR3091700A1 is not suitable for the dispensing of a solid compound, and cannot be adapted for the distribution of chlorine without human intervention.

Document EP0555600A1 discloses a device capable, in a flexible and suitable way, of treating swimming pool water with chlorine. The method uses the dissolving of a chlorinated agent by a controlled circulation of water: the control over the circulation of water controls the rate of dissolution and thereby adapts the chlorine level to suit the requirements. The device is made up of a container containing the chlorinated agent and comprising two orifices such that the water can circulate from one to the other. The open surface area of each of the two orifices can be controlled manually by operating a shutter over a grating. The device is intended to be placed in a region in which the water that is to be treated circulates, for example in a swimming pool skimmer. In this application, control over the openings is capable of varying the rate of dissolution in large proportions corresponding to the two extreme settings of shock chlorination and maintenance chlorination. The device disclosed in document EP0555600A1 is unable to allow the rate of dissolution of the chlorinated agent to be varied without human intervention, or without the pre-existence of a zone in which the swimming pool water to be treated can circulate.

Document FR2714044A1 discloses a device for the metered distribution of chlorine in a pool, designed to contain a reserve of chlorine pebbles to be dissolved progressively and suitable for being partially immersed in the water circulating through a surface skimmer. The device consists of a tubular reservoir designed to be able to slide vertically in the bore of a supporting stand, this reservoir being designed to receive internally a stack of chlorine pebbles which are able to slide unimpeded toward its closed lower end which is provided with a plurality of water passage orifices made in its bottom wall, and in its lateral wall, near this bottom wall. This lower end is designed to be plunged into the water to an adjustable depth. The device disclosed in this document is unable to vary the rate of dissolution of the chlorinated agent without human intervention, or without the pre-existence of a zone in which the swimming pool water to be treated can circulate.

There is a need for a device configured to dispense and adapt the delivery of a solid compound into a volume of liquid while minimizing human intervention, and such that implementation thereof does not require the pre-existence of a zone in which the liquid can circulate.

SUMMARY OF THE INVENTION

It is an object of the invention to provide a floating and energy-autonomous device configured to dispense a solid compound into a volume of liquid effectively without the need for a pre-existing circuit in which the liquid can circulate. The floating device is configured to regulate the flow rate of dissolved solid compound in the volume of liquid on the basis of signals from sensors and/or signals received by wireless communication in order to achieve a preferred state of the volume of liquid by dispensing the correct quantity of solid compound into the volume of liquid and in so doing minimize human intervention.

The invention is defined by the independent claims. The dependent claims define preferred embodiments.

According to a first aspect, the invention provides a floating and energy-autonomous device configured to dispense a solid compound into a volume of liquid, the solid compound being at least partially soluble in the liquid of the volume of liquid. The device is able to be immersed in the volume of liquid and to float freely at a surface separating the volume of liquid from a gaseous environment. The device comprises an immersed part and an emergent part which are separated by a plane containing the surface when the device is floating freely at the surface in a calm state, and a vertical axis inseparable from the device and aligned with the direction of the force of gravity when the device is floating freely at the surface in the calm state. The device further comprises:

a circulation circuit for the circulation of the liquid, comprising:
      i. a reservoir able to contain a reserve of solid compound and comprising an intake orifice and a discharge orifice, the reservoir being configured so that a circulating flow of the liquid coming from the volume of liquid and entering the reservoir via the intake orifice washes over at least part of the reserve of solid compound and dissolves and carries a flow of dissolved solid compound originating from the reserve of solid compound away from the reservoir and toward the volume of liquid via the discharge orifice,
      ii. a pump configured to generate the circulating flow of the liquid,
    a power supply module configured to supply power at least to the pump, and a control module,
    the control module comprising:
      i. a sensor configured to measure a measured value of a parameter of the volume of liquid and/or a measured value of a parameter of the gaseous environment, and to generate a sensor signal indicative of the measured value of the parameter of the volume of liquid and/or the measured value of the parameter of the gaseous environment and/or
      ii. a radio antenna configured to receive a radio signal, the radio signal preferably being indicative of at least one item of information received from among the following: a received value of a parameter of the volume of liquid, a received value of a parameter of the gaseous environment, a weather forecast received at the location of the device, a weather history received at the location of the device, a received schedule for activating the pump, which is preferably a daily schedule, a received target for the circulating flow rate of the liquid, a received target for the flow rate of dissolved solid compound, a received command regarding the power level of the pump, a received command for switching the pump ON/OFF, and for generating at least one antenna signal on the basis of the radio signal, iii. a microcontroller configured to receive the sensor signal and/or the antenna signal, and to command the pump and regulate or adapt the circulating flow rate of the liquid as a function of the sensor signal and/or of the antenna signal.

In one advantageous embodiment of the invention, the device is configured to deliver the solid compound further containing chlorine and/or bromine, to bathing water contained in a swimming pool, the solid compound preferably taking the form of tablets or pellets or pebbles or granules.

In one advantageous embodiment of the invention, the control module further comprises an inclination-measuring accelerometer configured to measure an angle of inclination between the direction of the force of gravity and the vertical axis of the device and to generate an inclination measurement signal indicative of the angle of inclination, and the microcontroller is configured to stop the pump when an absolute value of the angle of inclination exceeds a threshold value.

In one advantageous embodiment of the invention, the control module comprises an agitation-measuring accelerometer configured to measure an acceleration experienced by the device and to generate an agitation measurement signal indicative of the acceleration experienced by the device, the agitation-measuring accelerometer preferably being the inclination-measuring accelerometer, and the microcontroller is configured to receive the agitation measurement signal and from it derive a level of agitation of the liquid, the microcontroller being configured to adjust the circulating flow rate of the liquid on the basis of the level of agitation of the liquid.

In one advantageous embodiment of the invention, the device further comprises a second circulation circuit for circulating the liquid, comprising a second pump commanded by the microcontroller and supplied with power by the power supply module, the second circulation circuit comprising the second pump being configured to circulate the liquid from the volume of liquid toward the gaseous environment and to generate a jet of liquid passing through part of the gaseous environment, the microcontroller preferably being configured to command the second pump in at least:
a clock mode, in which the microcontroller is configured to briefly activate the second pump at time intervals preferably of between 1 and 60 min, or in,
a drive mode, in which the microcontroller is configured to briefly activate the second pump according to a series of activation sequences, a last activation sequence of the series of activation sequences preferably differing from the other activation sequences of the series of activation sequences.

In one advantageous embodiment of the invention, the intake orifice of the reservoir is closed by a pierced surface comprising at least one opening able to cause the liquid entering the reservoir to squirt over at least part of the reserve of solid compound.

In one advantageous embodiment of the invention, the circulation circuit is able to impose, on the liquid, a circulating flow rate of between 0 and 1 $dm^3/s$, and preferably of between 0 and 0.1 $dm^3/s$.

In one advantageous embodiment of the invention, the power supply module further comprises:
at least one photovoltaic cell attached to an external surface of the emergent part, and/or
a battery.

In one advantageous embodiment of the invention, the control module preferably comprises a memory and is configured to:
receive and preferably record in the memory at least one item of information from the microcontroller from among: the measured value of the parameter of the volume of liquid, the measured value of the parameter of the gaseous environment, an estimate of the circulating flow rate of the liquid, an estimate of the flow rate of dissolved solid compound, an estimate of the reserve of solid compound contained in the reservoir, a state of activation of the pump, a state of activation of the second pump, a power level of the pump, an ON/OFF status of the pump, a level of agitation of the liquid, a state of charge of the battery,
transmit an output signal from the microcontroller indicative of the at least one item of information of the microcontroller to at least one auxiliary device by means of a wireless communication.

In one advantageous embodiment of the invention, the control module is configured to command the pump, and to regulate the circulating flow rate of the liquid, on the basis of at least one input of the control module, from among the measured value of the parameter of the volume of liquid, the received value of the parameter of the volume of liquid, the measured value of the parameter of the gaseous environment, the received value of the parameter of the gaseous environment, the level of agitation of the liquid, the weather forecast received at the location of the device, the weather history received at the location of the device.

In one advantageous embodiment of the invention, the radio antenna is configured to communicate wirelessly with a floating auxiliary device floating in the volume of liquid, and to receive from the floating auxiliary device the received value of the parameter of the volume of liquid as measured by the floating auxiliary device, the parameter of the volume of liquid preferably being a temperature of the volume of liquid, an oxidation-reduction potential (ORP) of the volume of liquid, or a hydrogen potential (pH) of the volume of liquid, and the control module is configured to command the pump and to regulate the circulating flow rate of the liquid on the basis of the received value of the parameter of the volume of liquid.

According to a second aspect, the invention provides a kit of components comprising a device according to the first aspect of the invention, wherein the radio antenna is configured to communicate wirelessly with a floating auxiliary device floating in the volume of liquid, and to receive from the floating auxiliary device the received value of the parameter of the volume of liquid as measured by the floating auxiliary device, the parameter of the volume of liquid preferably being a temperature of the volume of liquid, an oxidation-reduction potential (ORP) of the volume of liquid, or a hydrogen potential (pH) of the volume of liquid, and wherein the control module is configured to command the pump and to regulate the circulating flow rate of the liquid on the basis of the received value of the parameter of the volume of liquid. The kit of components further comprises a floating auxiliary device configured to measure the received value of the parameter of the volume of liquid, wherein the parameter of the volume of liquid is preferably the temperature of the volume of liquid, the oxidation-reduction potential (ORP) of the volume of liquid, or the hydrogen potential (pH) of the volume of liquid, the floating auxiliary device further being configured to communicate wirelessly with the device of the kit of components.

BRIEF DESCRIPTION OF THE DRAWINGS

These aspects and other aspects of the invention will be explained in greater detail by means of the invention embodiment or embodiments described hereinafter by way of example(s), with reference to the attached drawings in which.

DETAILED DESCRIPTION OF ONE EMBODIMENT OF THE INVENTION

Figure 1:
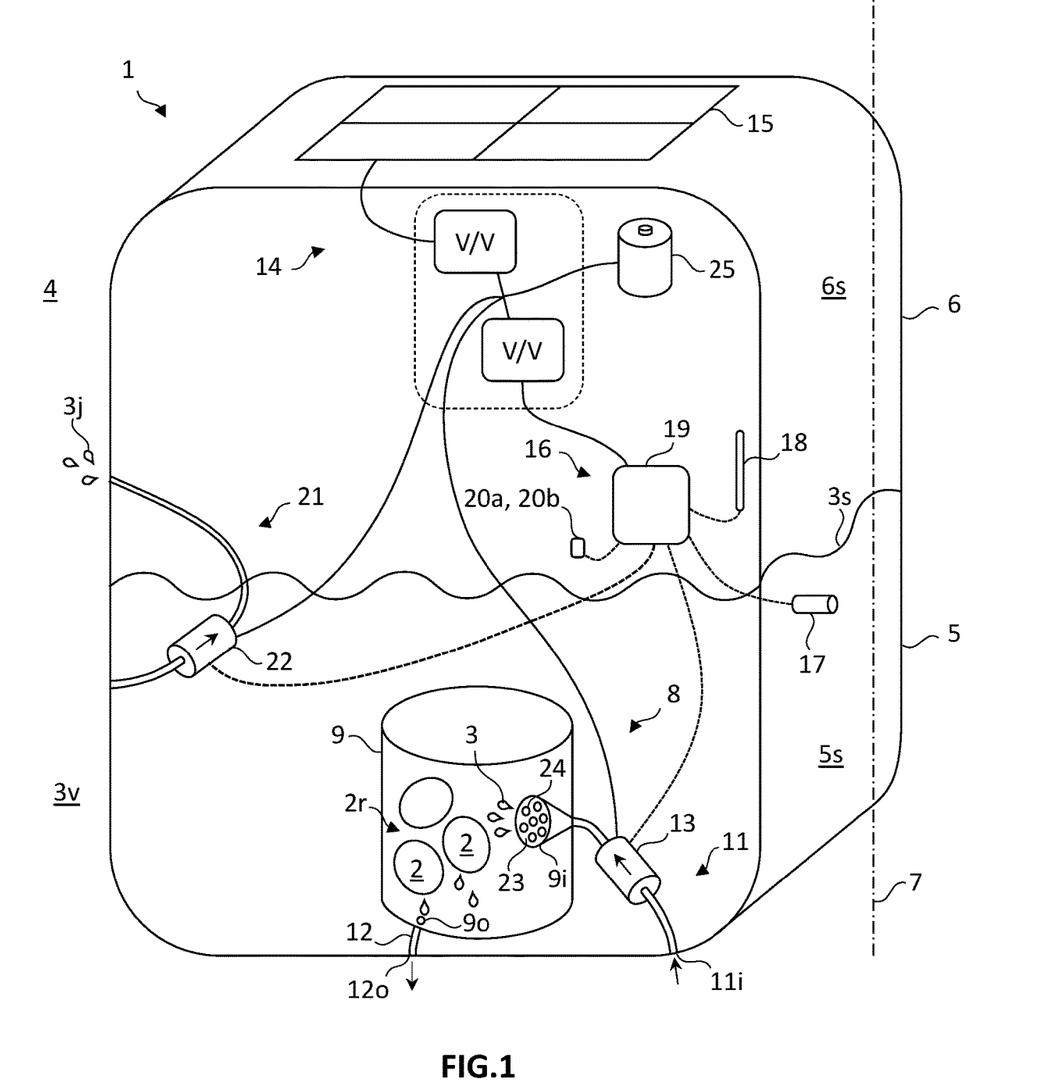
FIG. 1 is a schematic depiction of a device according to the invention.

With reference to FIG. 1, the device 1 according to the invention is configured to dispense or deliver a solid compound 2 into a volume 3v of liquid, the solid compound 2 being at least partially soluble in the liquid 3 contained in the volume 3v of liquid.

The device 1 according to the invention is configured to float freely at a surface 3s separating the volume 3v of liquid from a gaseous environment 4, which is to say that the device 1 is configured to float at the surface 3s when no force other than the force of gravity and the Archimedean upthrust is applied to it.

The device 1 according to the invention is able to be immersed in the volume 3v of liquid, which is to say that the device is configured not to develop a fault after being fully immersed in the volume 3v of liquid, preferably at a depth greater than 1 m, preferably at a depth comprised between 2 m and 5 m beneath the surface 3s.

Figure 3:
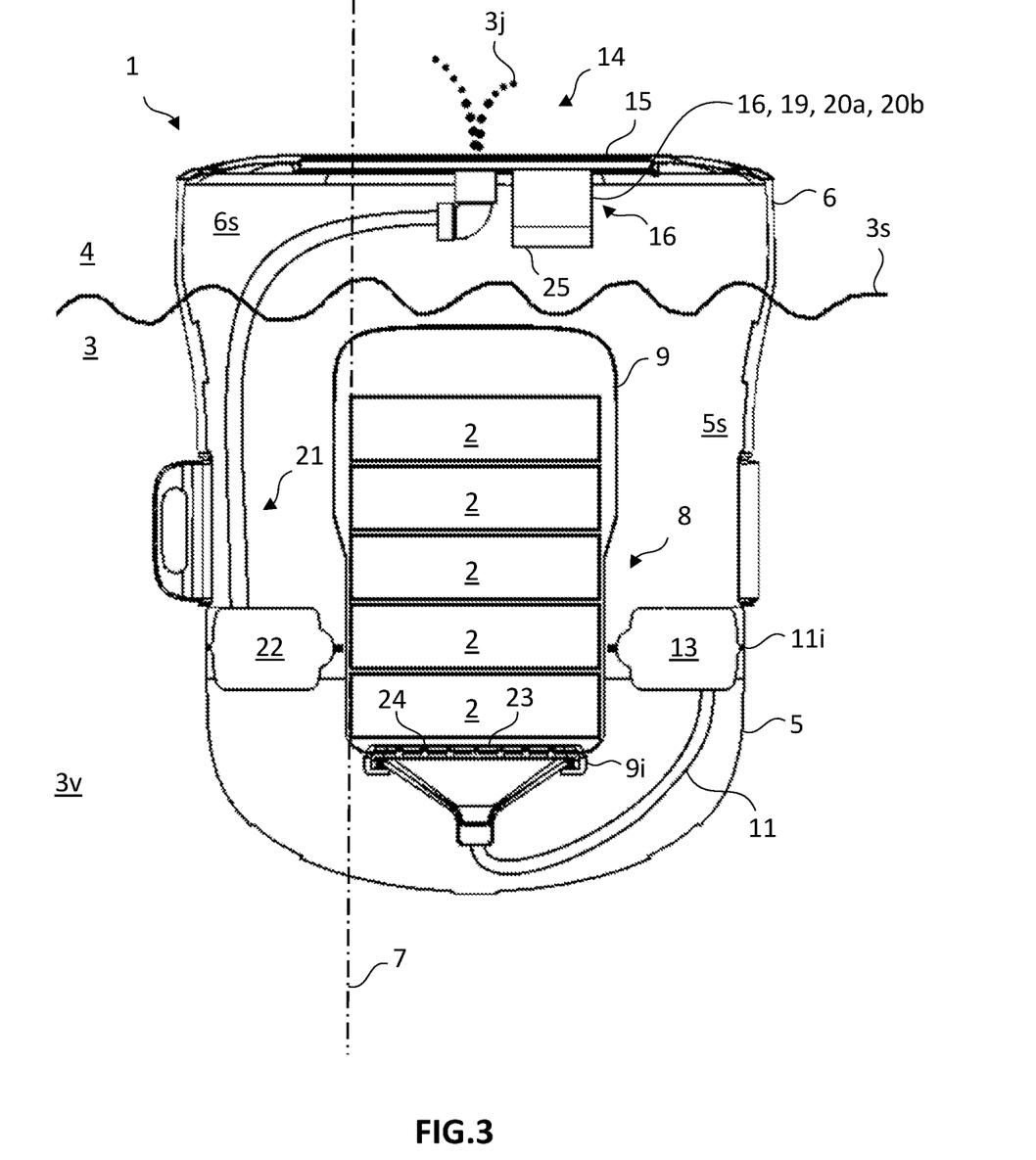
FIG. 3 is a view in cross section of a device according to the invention floating in a swimming pool.

As illustrated in FIGS. 1 and 3, the device 1 according to the invention comprises a vertical axis 7 inseparable from the device 1 and aligned with a direction of the force of gravity when the device 1 is floating freely at the surface 3s in a calm state. The surface 3s is considered to be in a calm state when it is flat and immobile and normal to the direction of the force of gravity.

As illustrated in FIGS. 1 and 3, the device 1 according to the invention comprises an immersed part 5 and an emergent part 6 which are defined as being parts of the device 1 that are separated by a plane containing the surface 3s when the device 1 is floating freely at the surface 3s in a calm state, the immersed part 5 or emergent part 6 being situated respectively beneath or above the plane when the device 1 is floating freely at the surface 3s in a calm state.
Solid Compound As illustrated in FIG. 3, the device 1 according to the invention is preferably configured to dispense the solid compound 2, which preferably contains chlorine and/or bromine, and preferably takes the form of at least one of the following: tablet, pellet, pebble, granule. The device 1 according to the invention is configured to withstand corrosion caused by the solid compound 2, preferably corrosion caused by chlorine and/or bromine.

The device 1 according to the invention is configured to dispense the solid compound 2 into the volume 3v of liquid, which is preferably bathing water for human beings, preferably contained in a swimming pool able to contain between 1 m$^3$ and 100 m$^3$, preferably between 1 m$^3$ and 30 m$^3$ of the liquid 3. As a preference, the gaseous environment 4 is an atmosphere close to the swimming pool.

Figure 5:
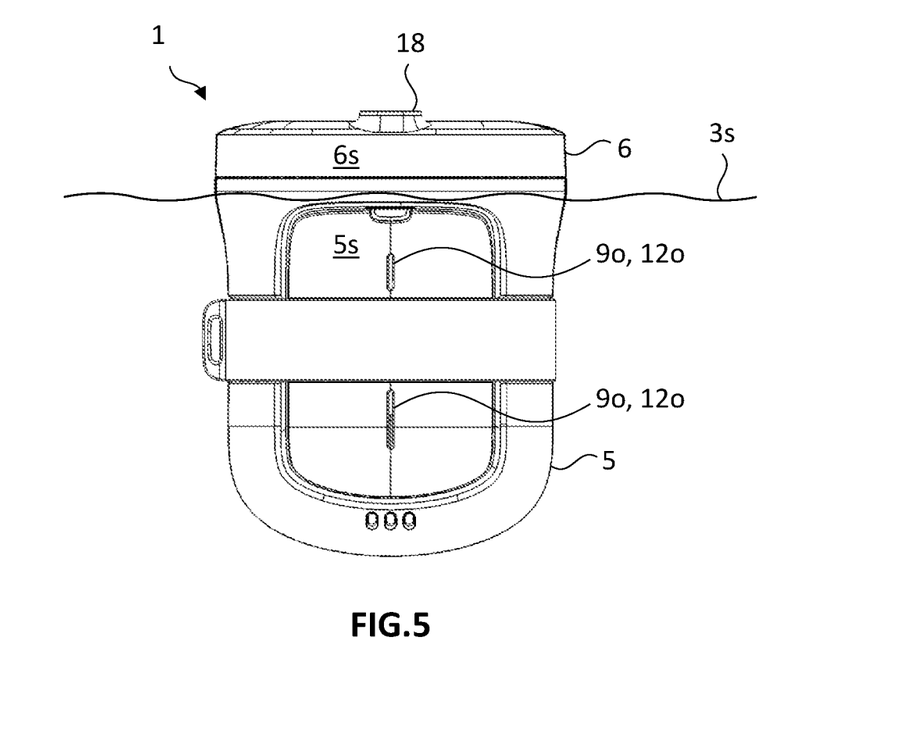
FIG. 5 is a side view of a device according to the invention.

In general, the handling, by a user, of a compound containing a high concentration of agent harmful to human health with a view to delivering it into a volume of liquid is considered to be less hazardous if the compound is in solid rather than liquid form. For example, in the case of the bathing water of a swimming pool, the handling of the chlorine-containing solid compound in the form of a tablet is reputed to be safer than handling the same compound in liquid form, because the risks of the operator getting splashes or sprayed droplets of the chlorine-containing compound on their hands or in their eyes is lower. Likewise, it is more difficult for a child to ingest a significant quantity of a compound containing a certain concentration of chlorine if the compound is in solid form rather than liquid. Compared with the devices of the prior art which are configured to dispense compound in liquid form, the device 1 according to the invention, which is configured to dispense a solid compound 2 into the volume 3v of liquid is therefore safer.
Reservoir As illustrated in FIGS. 1 and 3, the device 1 according to the invention comprises a circulation circuit 8 for circulating the liquid 3. The circulation circuit 8 comprises a reservoir 9 configured to contain a reserve 2r of solid compound, a maximum mass for the reserve 2r of solid compound preferably being comprised between 200 g and 1000 g. The reservoir 9 comprises an intake orifice 9i and a discharge orifice 9o, as illustrated in FIGS. 1 and 5. The circulation circuit 8 is configured so that a circulating flow of the liquid 3 originating, which is to say extracted, from the volume 3v of liquid, enters the reservoir 9 via the intake orifice 9i and passes through the reservoir 9 before returning to the volume 3v of liquid via the discharge orifice 9o. The reservoir 9 is configured so that the circulating flow of the liquid 3 entering the reservoir 9 via the intake orifice 9i washes, over at least part of the reserve 2r of solid compound and dissolves and carries a flow of dissolved solid compound originating from the reserve 2r of solid compound away from the reservoir 9 and toward the volume 3v of liquid via the discharge orifice 9o.

As illustrated in FIGS. 1 and 3, the intake orifice 9i of the reservoir 9 in the device 1 according to the invention is preferably closed by a pierced surface 23 comprising at least one opening 24, preferably several openings 24 and preferably able to cause the liquid 3 entering the reservoir 9 to squirt or splash over at least part of the reserve 2r of solid compound so as to increase the rate of dissolution of the solid compound 2 corresponding to a given circulating rate of the liquid, which is to say so as to increase the rate of solid compound dissolved corresponding to a given circulating rate of the liquid.
Pump The circulation circuit 8 of the device 1 according to the invention further comprises a pump 13 configured to impose the circulating rate of the liquid 3. As a preference, the circulation circuit 8 is configured to generate a flow rate of between 0 and 1 dm³/s, and preferably of between 0 and 0.1 dm³/s for the circulation of the liquid 3. As a preference, the circulation circuit 8 is configured to dispense the solid compound 2 into the volume 3v of liquid, wherein the liquid 3 is characterized by a dynamic viscosity at atmospheric pressure of less than 0.1 Pa·s, preferably less than 0.01 Pa·s, and preferably less than 0.002 Pa·s.

In the device 1 according to the invention, the reservoir 9 is configured so that a washing of at least part of the reserve 2r of solid compound increases with the circulating flow rate of the liquid 3. By increasing the power or level of activation of the pump 13, it is therefore possible to increase the flow rate of dissolved solid compound delivered by the device 1 into the volume 3v of liquid. Unlike with the devices of the prior art, the device 1 according to the invention comprises the circulation circuit 8 comprising the pump 13 which are configured to generate the circulating flow rate of the liquid 3, to dissolve the solid compound 2 and to deliver the solid compound 2 into the volume of liquid 3. The device 1 according to the invention therefore does not need to be installed in a pre-existing zone for the circulation of water in the volume 3v of liquid in order to deliver, which is to say to dispense, the solid compound 2 into the water effectively, which is to say by a phenomenon of convective transfer rather than by diffusion. For example, the device 1 according to the invention and configured to deliver the chlorine-containing and/or bromine-containing solid compound 2 into the bathing water of a swimming pool is able to deliver the chlorine-containing and/or bromine-containing solid compound 2 into the bathing water of a swimming pool that has no swimming pool pump, which is the case with many small-sized swimming pools, for example containing less than 2 m³ of water. In addition, the device 1 according to the invention allows the flow rate of dissolved solid compound to be adjusted by means of the circulating flow rate of the liquid 3, as generated by the pump 13, thereby making it possible to optimize the consumption of the solid compound 2 by the device 1 and to optimize the energy consumed by the device 1 to deliver the solid compound 2 into the volume 3v of liquid.

As depicted in FIG. 1, the reservoir 9 of the device 1 according to the invention may be in fluidic communication with the volume 3v of liquid via a supply circuit 11 supplying the reservoir 9 of the device 1, the supply circuit 11 connecting the intake orifice 9i to an inlet orifice of the supply circuit 11i which is preferably comprised in an external surface of the immersed part 5s, the supply circuit 11 preferably comprising the pump 13.

As depicted in FIG. 1, the reservoir 9 of the device 1 according to the invention may be in fluidic communication with the volume 3v of liquid via a discharge circuit 12 connecting the discharge orifice 9o to an outlet orifice of the discharge circuit 12o which is preferably comprised in an external surface of the immersed part 5s.

In a preferred embodiment of the device 1 according to the invention and depicted in FIG. 5, the outlet orifice of the discharge circuit 12o and the discharge orifice 9o of the reservoir 9 are coincident, the discharge circuit 12 preferably being formed by an opening or slot passing through a wall separating the reservoir 9 from the external surface of the immersed part 5s.

Power Supply Module

The device 1 according to the invention comprises a power supply module 14 configured to supply power to at least the pump 13 and a control module 16 of the device 1. In one preferred embodiment as depicted in FIG. 1, the power supply module 14 comprises at least one photovoltaic cell 15 attached to an external surface of the emergent part 6s of the device, and/or a battery 25.

Figure 4:
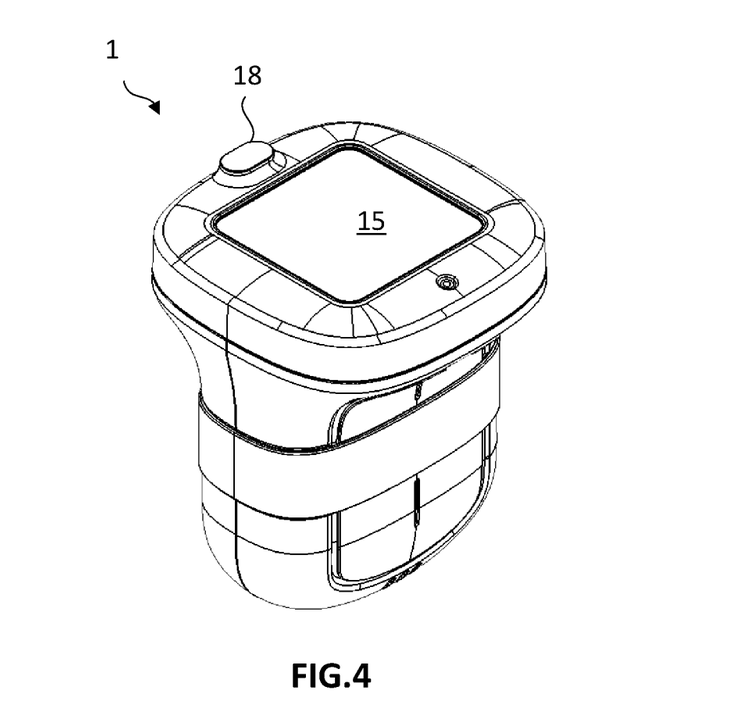
FIG. 4 is a view in isometric projection of a device according to the invention.

The device 1 according to the invention is configured to be energy-autonomous, which is to say that the device 1 does not require a permanent wired power supply in order to operate. As a preference, the device comprises the battery 25, and the at least one photovoltaic cell 15, as illustrated in FIGS. 3 and 4. The battery is preferably rechargeable by the photovoltaic cell, preferably via a voltage converter V/V configured to convert a voltage of the at least one photovoltaic cell 15 into a voltage of the battery 25, as illustrated in FIG. 1. As a preference, the at least one photovoltaic cell 15 attached to the external surface of the emergent part 6s of the device is oriented in such a way that a normal to a surface of the at least one photovoltaic cell 15 is parallel to the vertical axis 7 so that the solar radiation captured by the at least one photovoltaic cell 15 is maximized.

With reference to FIG. 1, the microcontroller 19 may be powered by the battery 25 via a second voltage converter V/V which is preferably a converter with a small voltage drop.

Sensor

The device 1 according to the invention comprises a control module 16 comprising a sensor 17 and/or a radio antenna 18, and a microcontroller 19.

The sensor 17 of the device 1 according to the invention is configured to measure at least one measured value of a parameter of the volume 3v of liquid and/or to measure at least one measured value of a parameter of the gaseous environment 4. The parameter of the volume 3v of liquid is, for example, a temperature of the volume 3v of liquid, an oxidation-reduction potential (ORP) of the volume 3v of liquid, or a hydrogen potential (pH) of the volume 3v of liquid, and the parameter of the gaseous environment 4 is, for example, a temperature of the gaseous environment 4.

As a preference, the device 1 according to the invention comprises at least one sensor 17 from among:
- a temperature sensor configured to measure a measured value of the temperature of the volume 3v of liquid,
- a temperature sensor configured to measure a measured value of the temperature of the gaseous environment 4,
- an ORP sensor configured to measure a measured value of the oxidation-reduction potential (ORP) of the volume of liquid 3,
- a hydrogen-potential (pH) sensor configured to measure a measured value of the pH of the volume 3v of liquid.

In the device 1 according to the invention comprising the sensor 17, the sensor 17 is further configured to generate a sensor signal indicative of the measured value of the parameter of the volume 3v of liquid and/or the measured value of the parameter of the gaseous environment 4.

As a preference, the device 1 according to the invention comprises several sensors 17 configured to measure several measured values of the parameter of the volume 3v of liquid and/or several measured values of the parameter of the gaseous environment 4.

Radio Antenna

Figure 2:
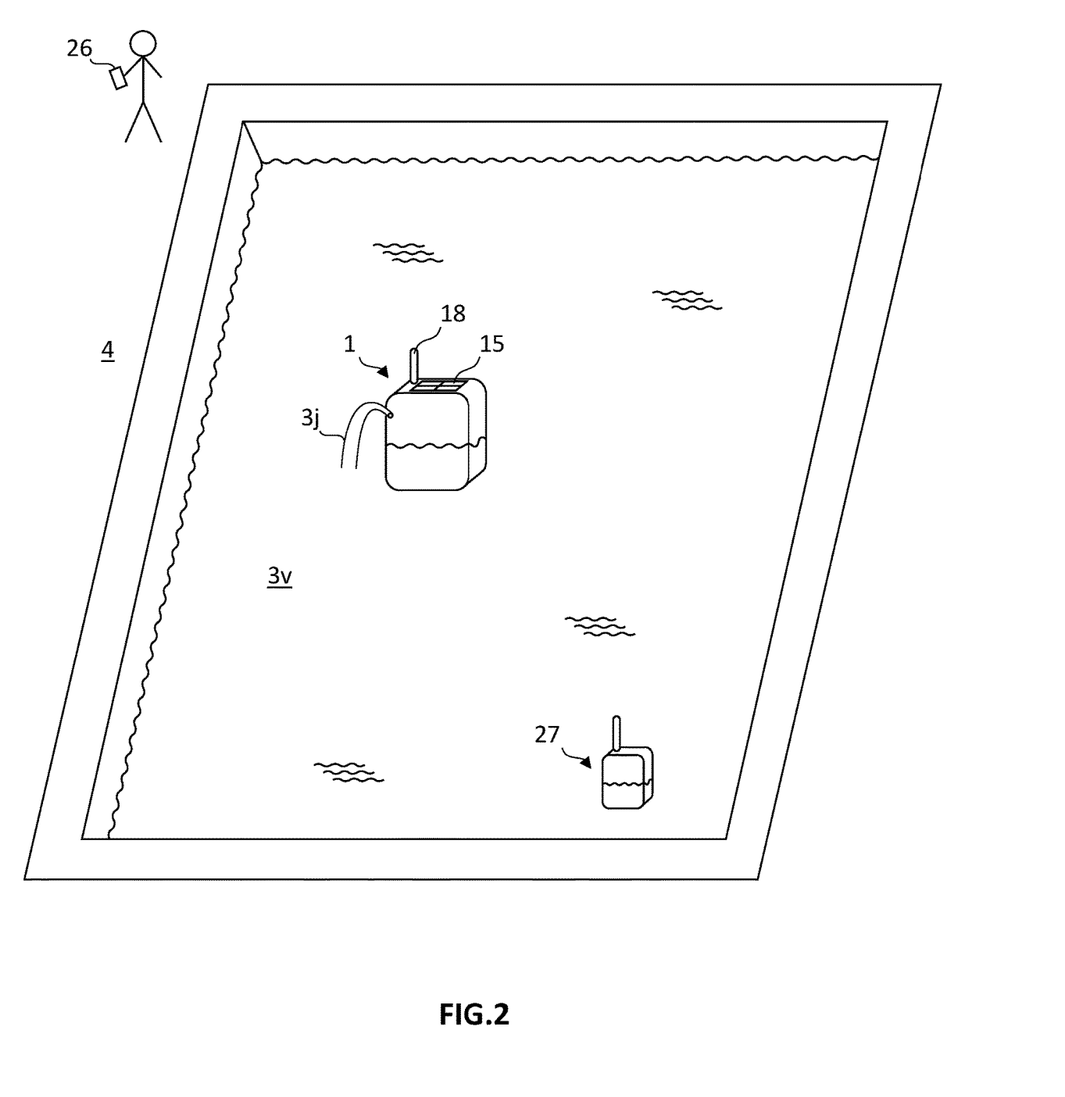
FIG. 2 is a schematic depiction of a device according to the invention and of an auxiliary device floating in a swimming pool.

As illustrated in FIGS. 2 and 4, the radio antenna 18 of the device 1 according to the invention is configured to receive a radio signal from an auxiliary device 26 or from a floating auxiliary device 27, preferably via Bluetooth (BLE), and/or Wi-Fi, and/or a GSM communication network, for example using 4G or 5G, and/or Sigfox.

The radio signal preferably represents at least one item of received information from among the following:

a received value of the parameter of the volume 3v of liquid, which value is preferably measured and sent by the floating auxiliary device 27, the parameter of the volume 3v of liquid being preferably one of the following: the temperature of the volume 3v of liquid, the oxidation-reduction potential (ORP) of the volume 3v of liquid, the hydrogen potential (pH) of the volume 3v of liquid, a received value of the parameter of the gaseous environment 4, which value is preferably measured and sent by the floating auxiliary device 27, the parameter of the gaseous environment 4 preferably being the temperature of the gaseous environment 4, a weather forecast received at the location of the device 1, and which is preferably sent by the auxiliary device 26, and which comprises for example forecasts for the temperature of the gaseous environment 4, forecasts of precipitation in the gaseous environment 4, forecasts of wind speeds in the gaseous environment 4, forecasts of wind directions in the gaseous environment 4, a weather history received at the location of the device 1, and which comprises for example a history of the temperature of the gaseous environment 4, a history of precipitation in the gaseous environment 4, a history of wind speeds in the gaseous environment 4, a history of wind directions in the gaseous environment 4, a received schedule for activating the pump 13, which is preferably a daily schedule, and which is preferably sent by the auxiliary device 26, and which preferably comprises a received algorithm for regulating the pump 13 as a function of at least one of the following:

a daily timetable, the measured value of the parameter of the volume 3v of liquid, the measured value of the parameter of the gaseous environment 4, one of the at least one item of information received by the radio antenna 18, a received target for the circulating flow rate of the liquid 3, a received target for the flow rate of dissolved solid compound, a received command regarding the power level of the pump 13, a received command for switching the pump 13 ON/OFF.

The radio antenna 18 of the device 1 according to the invention is configured to generate at least one antenna signal on the basis of the radio signal.

Microcontroller

The microcontroller 19 of the device 1 according to the invention is configured to receive the sensor signal and/or the antenna signal and to command the pump 13 and regulate the circulating flow rate of the liquid as a function of the sensor signal and/or of the antenna signal. On the basis of the sensor signal and/or of the antenna signal, the microcontroller 19 is therefore configured to command the pump 19 and thereby regulate the circulating flow rate of the liquid 3 and, ultimately, the flow rate of dissolved solid compound which is dispensed into the volume 3v of liquid. In a preferred embodiment of the device 1 according to the invention comprising a radio antenna 18, the radio antenna 18 is configured to receive the radio signal emitted by the floating auxiliary device 27 and indicative of a received value of the oxidation-reduction potential (ORP) of the volume of liquid 3 as measured by the floating auxiliary device 27, and the microcontroller 19 is configured to command the pump 13 as a function of the received value of the oxidation-reduction potential (ORP) of the volume of liquid 3.

As a preference, the microcontroller 19 of the device 1 according to the invention is configured to execute a schedule for activating the pump 13. The schedule for activating the pump 13 is preferably recorded in a memory contained in the control module 16. This schedule for activating the pump 13 may be installed in the microcontroller 19 at the time of manufacture of the device 1. As a preference, the radio antenna 18 of the device 1 according to the invention is configured to receive the radio signal from the auxiliary device 26 representing the received schedule for activating the pump 13, and the microcontroller 19 is configured to replace and/or update the schedule for activating the pump 13 on the basis of the received schedule for activating the pump 13.

Accelerometer

In a preferred embodiment of the device 1 according to the invention as depicted in FIG. 1, the control module 16 further comprises an inclination-measuring accelerometer 20a configured to measure an angle of inclination between the direction of the force of gravity and the vertical axis 7 of the device 1, and to generate an inclination measurement signal indicative of the angle of inclination. As a preference, the microcontroller 19 is configured to receive the inclination measurement signal and to stop the pump 13 if an absolute value of the angle of inclination exceeds a threshold value, the threshold value preferably being comprised between 20° and 60°, preferably between 30° and 45°. As a preference, the microcontroller 19 is configured to stop the pump 13 if the absolute value of the angle of inclination exceeds the threshold value for at least 30 s, preferably for at least 10 s, preferably for at least 2 s.

As a preference, the device 1 according to the invention is configured to tilt when it is on a planar surface outside of the volume 3v of liquid so that the absolute value of the angle of inclination is greater than the threshold value of 30°, and the microcontroller 19 is configured to stop the pump 13 of the device 1 according to the invention if the absolute value of the angle of inclination exceeds the threshold value equal to 30°. In that way, the device 1 according to the invention avoids for example activating the pump 13 when the device 1 is out of the water and situated on a planar surface, so as to reduce the energy consumption of the device 1.

In one preferred embodiment of the device 1 according to the invention, the control module 16 further comprises an agitation-measuring accelerometer 20b configured to measure an acceleration experienced by the device 1 and to generate an agitation measurement signal indicative of the acceleration experienced by the device 1. As a preference, the agitation-measuring accelerometer 20b is also the inclination-measuring accelerometer 20a, as depicted in FIG. 1. As a preference, the microcontroller 19 is configured to receive the agitation measurement signal in order to determine a level of agitation of the liquid 3 on the basis of the agitation measurement signal, and to regulate or adjust the circulating flow rate of the liquid 3 on the basis of the level of agitation of the liquid 3.

As a preference, in the device 1 according to the invention configured to dispense chlorine into the bathing water of the swimming pool, the microcontroller 19 is configured to increase the circulating flow rate of the liquid 3 in the device 1, and therefore the flow rate of dissolved solid compound delivered into the bathing water of the swimming pool, if the level of agitation of the liquid 3 increases, so as to maintain a sufficient degree of cleanliness of the bathing water of the swimming pool.

Second Liquid Circulation Circuit

As depicted in FIGS. 1 to 5, the device 1 according to the invention may further comprise a second circulation circuit 21 for circulating the liquid 3, which comprises a second pump 22 commanded by the microcontroller 19 and supplied with power by the power supply module 14. The second circulation circuit 21 comprising the second pump 22 is configured to circulate the liquid 3 from the volume 3v of liquid toward the gaseous environment 4, generating a jet 3j of liquid passing through part of the gaseous environment 4. As a preference, the device 1 according to the invention is configured to activate the second pump 22 in order to generate a jet 3j of liquid visible to a user situated at a distance of between 0 m and 20 m from the device 1. As a preference, the microcontroller 19 is configured to activate the second pump 22 briefly, namely for a duration of between 1 s and 10 s, so that the jet 3j of liquid is generated briefly for that same length of time.

The microcontroller 19 is preferably configured to command the second pump 22 in at least one of the following modes of activation of the second pump:

a clock mode, in which the microcontroller 19 is configured to briefly activate the second pump 22 at time intervals preferably of between 1 and 60 min. As a preference, the device 1 according to the invention is configured to receive the radio signal emitted by the auxiliary device 26 indicative of the time intervals received and to briefly activate the second pump 22 on the basis of the received time intervals.

a drive mode, in which the microcontroller 19 is configured to briefly activate the second pump 22 according to a series of activation sequences, a last activation sequence of the series of activation sequences preferably differing from the other activation sequences of the series of activation sequences.

As a preference, the device 1 according to the invention is configured to receive the radio signal emitted by the auxiliary device 26 indicative of a received mode of activation of the second pump, and to activate the second pump 22 according to the received mode of activation of the second pump. The auxiliary device 26 is preferably a smart phone so that the mode of activation of the second pump can be commanded remotely by a user of the smartphone.

Transmission

In a preferred embodiment of the device 1 according to the invention, the control module 16 preferably comprises the memory and is configured to receive, and preferably to record in the memory, at least one item of information of the microcontroller, from among:

the measured value of the parameter of the volume 3v of liquid, which is measured by the sensor 17, the measured value of the parameter of the gaseous environment 4, which is measured by the sensor 17, an estimate of the circulating flow rate of the liquid 3, which is preferably calculated by the microcontroller 19, an estimate of the flow rate of dissolved solid compound 2, which is preferably calculated by the microcontroller 19, an estimate of the reserve 2r of solid compound contained in the reservoir 9, which is preferably calculated by the microcontroller 19, a state of activation of the pump 13, which is preferably sent by the pump 13 or by the microcontroller 19, a state of activation of the second pump 22, which is preferably sent by the second pump 22 or by the microcontroller 19, a power level of the pump 13, which is preferably sent by the pump 13 or by the microcontroller 19, an ON/OFF status of the pump 13, which is preferably sent by the pump 13 or by the microcontroller 19, the level of agitation of the liquid 3, which is preferably sent by the microcontroller 19, a state of charge of the battery 25, which is preferably sent by the microcontroller 19.

As a preference, the device 1 is configured so that the control module 16 receives the at least one item of information from the microcontroller which is sent by the sensor 17, by the pump 13 or by the microcontroller 19.

As a preference, the at least one item of information of the microcontroller is instantaneous or in the form of a history. For example, the level of agitation of the liquid 3 may be an instantaneous level of agitation of the liquid 3, or may be a history of the level of agitation of the liquid 3 over the last 24 hours and recorded in the memory.

As a preference, the control module 16 is configured to transmit an output signal from the microcontroller 19 indicative of the at least one item of information of the microcontroller to at least one auxiliary device 26 by means of a wireless communication, preferably via the antenna 18 or via a second transmission antenna, so that a user of the auxiliary device 26 can remotely access the at least one item of information from the microcontroller.

Control Module Preferred Inputs

In one preferred embodiment of the device 1 according to the invention, the control module 16 is configured to command the pump 13, and to regulate the circulating flow rate of the liquid, on the basis of at least one input of the control module 16, from among:

the measured value of the parameter of the volume 3v of liquid, the received value of the parameter of the volume 3v of liquid, which is for example received from the floating auxiliary device 27, the measured value of the parameter of the gaseous environment 4, the received value of the parameter of the gaseous environment 4, which is for example received from the floating auxiliary device 27, the level of agitation of the liquid 3, the weather forecast received at the location of the device 1, which is for example received from the auxiliary device 26, the weather history received at the location of the device 1, which is for example received from the auxiliary device 26.

Auxiliary Devices

As a preference, the auxiliary device 26 is an Internet access point, for example a Wi-Fi terminal or a mobile phone network relay antenna, or a wireless communications device, for example a tablet or a mobile phone. As a preference, the auxiliary device 26 comprises a touch-sensitive user interface and is configured to execute an application that allows the user of the auxiliary device 26 to remotely command the device 1 according to the invention and/or to remotely receive information from the device 1.

As a preference, the floating auxiliary device 27 is energy autonomous, comprises a sensor of the floating auxiliary device, and is configured to measure the received value of the parameter of the volume 3v of liquid and/or the received value of the parameter of the gaseous environment 4. As a preference, the parameter of the volume 3v of liquid is the temperature of the volume 3v of liquid or the oxidation-reduction potential (ORP) of the volume 3v of liquid, or the hydrogen potential (pH) of the volume 3v of liquid. As a preference, the floating auxiliary device 27 is configured to measure several received values of the parameter of the volume 3v of liquid and/or several received values of the parameter of the gaseous environment 4. For example, the floating auxiliary device 27 may be an EcO probe developed by iopool.

In a preferred embodiment of the device 1 according to the invention, the radio antenna 18 is configured to communicate wirelessly with the floating auxiliary device 27 floating in the volume 3v of liquid, and to receive from the floating auxiliary device 27 the received value or values of the parameter of the volume 3v of liquid as measured by the floating auxiliary device 27, the parameter of the volume 3v of liquid preferably being the temperature of the volume 3v of liquid, the oxidation-reduction potential (ORP) of the volume 3v of liquid, or the hydrogen potential (pH) of the volume 3v of liquid, and the control module 16 is configured to command the pump 13 and to regulate the circulating flow rate of the liquid 3 on the basis of the received value or values of the parameter of the volume 3v of liquid.

Kit of Components

The invention also comprises a kit of components comprising the floating auxiliary device 27 and the device 1 according to the invention.

The floating auxiliary device 27 of the kit of components according to the invention is configured to measure the received value of the parameter of the volume of liquid 3, wherein the parameter of the volume 3v of liquid is preferably the temperature of the volume 3v of liquid, or the oxidation-reduction potential (ORP) of the volume 3v of liquid, or the hydrogen potential (pH) of the volume 3v of liquid. The floating auxiliary device 27 of the kit of components according to the invention is further configured to communicate wirelessly with the device 1 of the kit of components according to the invention.

The device 1 of the kit of components according to the invention comprises the radio antenna 18 which is configured to communicate wirelessly with the floating auxiliary device 27 and to receive from the floating auxiliary device 27 the received value of the parameter of the volume 3v of liquid as measured by the floating auxiliary device 27. The device 1 of the kit of components according to the invention further comprises the control module 16 which is configured to command the pump 13 and to regulate the circulating flow rate of the liquid 3 on the basis of the received value of the parameter of the volume 3v of liquid, as measured by the floating auxiliary device 27.

The kit of components is configured to be able, energy-autonomously and without human intervention except for the refilling of the reservoir 9 with solid compound 2, to measure the received value of the parameter of the volume of liquid 3 and adapt the flow rate of dissolved solid compound delivered into the volume 3v of liquid as a function of the received value of the parameter of the volume of liquid 3. For example, the received value of the parameter of the liquid 3 may be measured by the floating auxiliary device 27 situated at a different location in the swimming pool of the device 1 according to the invention which is configured to deliver the chlorine into the swimming pool. Compared with the use of the device 1 according to the invention alone and configured to measure, itself, the value of the parameter of the volume of liquid which, in the kit of components according to the invention, is supplied by the floating auxiliary device 27, the use of the kit of components according to the invention makes it possible to avoid the solid compound 2 delivered by the device 1 into the volume 3v of liquid in the vicinity of the device 1 affecting the measurement of the value of the parameter of the volume of liquid by the device 1. The regulation of the flow rate of dissolved solid compound delivered into the entirety of the volume 3v of liquid by the device 1 comprised in the kit of components according to the invention will therefore be improved compared with the event of the device 1 according to the invention being used on its own.

REFERENCES device (1)
solid compound (2)
reserve of solid compound (2r)
liquid (3)
jet of liquid (3j)
volume of liquid (3v)
surface (3s)
gaseous environment (4)
immersed part (5)
external surface of the immersed part (5s)
emergent part (6)
external surface of the emergent part (6s)
vertical axis (7)
circulation circuit (8)
reservoir (9)
intake orifice (9i)
discharge orifice (9o)
supply circuit (11)
supply circuit inlet orifice (11i)
discharge circuit (12)
discharge circuit outlet orifice (12o)
pump (13)
power supply module (14)
photovoltaic cell (15)
control module (16)
sensor (17)
radio antenna (18)
microcontroller (19)
inclination-measuring accelerometer (20a)
agitation-measuring accelerometer (20b)
second circulation circuit (21)
second pump (22)
pierced surface (23)
opening (24)
battery (25)
auxiliary device (26)
floating auxiliary device (27)

The invention claimed is:

1. A floating and energy-autonomous device (1) configured to dispense a solid compound (2) into a volume (3v) of liquid, the solid compound (2) being at least partially soluble in the liquid (3) of the volume (3v) of liquid, the device (1) being able to be immersed in the volume (3v) of liquid and to float freely at a surface (3s) separating the volume (3v) of liquid from a gaseous environment (4), the device (1) comprising an immersed part (5) and an emergent part (6) which are separated by a plane containing the surface (3s) when the device (1) is floating freely at the surface (3s) in a calm state, and a vertical axis (7) inseparable from the device (1) and aligned with the direction of the force of gravity when the device (1) is floating freely at the surface (3s) in the calm state, where the surface (3s) is considered to be in the calm state when the surface (3s) is flat and immobile and the surface (3s) is normal to the direction of the force of gravity, the device (1) further comprising:
- a circulation circuit (8) for the circulation of the liquid (3), comprising:
  - (i) a reservoir (9) able to contain a reserve (2r) of solid compound and comprising an intake orifice (9i) and a discharge orifice (9o), the reservoir being configured so that a circulating flow rate of the liquid (3) coming from the volume (3v) of liquid and entering the reservoir (9) via the intake orifice (9i) washes over at least part of the reserve (2r) of solid compound and dissolves and carries a flow of dissolved solid compound originating from the reserve (2r) of solid compound away from the reservoir and toward the volume (3v) of liquid via the discharge orifice (9o),
  - (ii) a pump (13) configured to generate the circulating flow rate of the liquid (3),
- a power supply module (14) configured to supply power at least to the pump (13), and
- a control module (16) comprising at least one of:
  - (i) a sensor (17) configured to measure at least one of a measured value of a parameter of the volume (3v) of liquid and a measured value of a parameter of the gaseous environment (4), and to generate a sensor signal indicative of at least one of the measured value of the parameter of the volume (3v) of liquid and the measured value of the parameter of the gaseous environment (4), and
  - (ii) a radio antenna (18) adapted to send and receive a radio signal, and wherein the control module (16) further comprises:
  - (iii) a microcontroller (19) configured to receive at least one of the sensor signal and the antenna signal, and to command the pump (13) and regulate or adapt the circulating flow rate of the liquid as a function of at least one of the sensor signal and of the antenna signal.

2. The device (1) as claimed in claim 1, configured to deliver the solid compound (2) further containing at least one of chlorine and bromine, to bathing water contained in a swimming pool.

3. The device (1) as claimed in claim 1, wherein the control module (16) further comprises an inclination-measuring accelerometer (20a) configured to measure an angle of inclination between the direction of the force of gravity and the vertical axis (7) of the device (1) and to generate an inclination measurement signal indicative of the angle of inclination, and wherein the microcontroller (19) is configured to stop the pump (13) when an absolute value of the angle of inclination exceeds a threshold value.

4. The device (1) as claimed in claim 1, wherein:
the control module (16) comprises an agitation-measuring accelerometer (20b) configured to measure an acceleration experienced by the device (1) and to generate an agitation measurement signal indicative of the acceleration experienced by the device (1),
the microcontroller (19) is configured to receive the agitation measurement signal and based on the agitation measurement signal received the microcontroller (19) is adapted to determine a level of agitation of the liquid (3), the microcontroller (19) being configured to adjust the circulating flow rate of the liquid (3) on the basis of the determined level of agitation of the liquid (3).

5. The device (1) as claimed in claim 1, and further comprising a second circulation circuit (21) for circulating the liquid (3), comprising a second pump (22) commanded by the microcontroller (19) and supplied with power by the power supply module (14), the second circulation circuit (21) comprising the second pump (22) being configured to circulate the liquid (3) from the volume (3v) of liquid toward the gaseous environment (4) and to generate a jet (3j) of liquid passing through part of the gaseous environment (4).

6. The device (1) as claimed in claim 1, wherein the intake orifice (9i) of the reservoir (9) is closed by a pierced surface (23) comprising at least one opening (24) able to cause the liquid (3) entering the reservoir (9) to squirt over at least part of the reserve (2r) of solid compound.

7. The device (1) as claimed in claim 1, and of which the circulation circuit (8) is able to impose, on the liquid (3), a circulating flow rate of between 0 and 1 $dm^3/s$.

8. The device (1) as claimed in claim 1, and wherein the power supply module (14) further comprises at least one of:
- at least one photovoltaic cell (15) attached to an external surface of the emergent part (6s), and
- a battery (25).

9. The device (1) as claimed in claim 1, and of which the control module (16) is configured to:
receive at least one item of information from the microcontroller from among: the measured value of the parameter of the volume (3v) of liquid, the measured value of the parameter of the gaseous environment (4), an estimate of the circulating flow rate of the liquid (3), an estimate of the flow rate of dissolved solid compound, an estimate of the reserve (2r) of solid compound contained in the reservoir (9), a state of activation of the pump (13), a state of activation of the second pump (22), a power level of the pump (13), an ON/OFF status of the pump (13), the level of agitation of the liquid (3), or a state of charge of the battery (30),
transmit an output signal from the microcontroller (19) indicative of the at least one item of information from the microcontroller to at least one auxiliary device (26) by means of a wireless communication.

10. The device (1) as claimed in claim 1, and wherein the control module (16) is configured to command the pump (13), and to regulate the circulating flow rate of the liquid, on the basis of at least one input of the control module, from among:
- the measured value of the parameter of the volume (3v) of liquid,
- the received value of the parameter of the volume (3v) of liquid,
- the measured value of the parameter of the gaseous environment (4),
- the received value of the parameter of the gaseous environment (4),
- a level of agitation of the liquid (3),
- a weather forecast received at the location of the device (1), or
- a weather history received at the location of the device (1).

11. The device (1) as claimed in claim 1, and wherein:
the radio antenna (18) is configured to communicate wirelessly with a floating auxiliary device (27) floating in the volume (3v) of liquid, and to receive from the floating auxiliary device (27) the received value of the parameter of the volume (3v) of liquid as measured by the floating auxiliary device (27), and
the control module (16) is configured to command the pump (13) and to regulate the circulating flow rate of the liquid (3) on the basis of the received value of the parameter of the volume (3v) of liquid.

12. A kit of components comprising:
a device (1) as claimed in claim 11,
a floating auxiliary device (27) configured to measure the received value of the parameter of the volume of liquid (3), and to communicate wirelessly with the device (1) as claimed in claim 11.

13. The device (1) as claimed in claim 1, wherein the radio signal is indicative of at least one item of received information from among the following: a received value of a parameter of the volume (3v) of liquid, a received value of a parameter of the gaseous environment (4), a received weather forecast at the location of the device (1), a received weather history at the location of the device (1), a received schedule for activating the pump (13), a received target for the circulating flow rate of the liquid (3), a received target for the flow rate of dissolved solid compound, a received command regarding the power level of the pump (13), a received command for switching the pump (13) ON/OFF.

14. The device (1) as claimed in claim 2, wherein the solid compound (2) is in the form of tablets or pellets or pebbles or granules.

15. The device (1) as claimed in claim 4, wherein the agitation-measuring accelerometer (20b) is the inclination-measuring accelerometer (20a).

16. The device (1) as claimed in claim 5, wherein the microcontroller (19) is configured to command the second pump (22) in at least:
a clock mode, in which the microcontroller (19) is configured to briefly activate the second pump (22) at time intervals, or in
a drive mode, in which the microcontroller (19) is configured to briefly activate the second pump (22) according to a series of activation sequences.

17. The device (1) as claimed in claim 16, wherein the time intervals are between 1 and 60 min, or the last activation sequence of the series of activation sequences differs from the other activation sequences of the series of activation sequences.

18. The device (1) as claimed in claim 7, wherein circulating flow rate is between 0 and 0.1 $dm^3$/s.

19. The device (1) as claimed in claim 9, wherein the control module further comprises a memory, the memory configured to:
to record in the memory at least one item of information received from the microcontroller from among: the measured value of the parameter of the volume (3v) of liquid, the measured value of the parameter of the gaseous environment (4), the estimate of the circulating flow rate of the liquid (3), the estimate of the flow rate of dissolved solid compound, the estimate of the reserve (2r) of solid compound contained in the reservoir (9), the state of activation of the pump (13), the state of activation of the second pump (22), the power level of the pump (13), the ON/OFF status of the pump (13), the level of agitation of the liquid (3), or the state of charge of the battery (30).

20. The kit of components as claimed in claim 12, wherein the parameter of the volume of liquid (3) is at least one of the temperature of the volume (3v) of liquid, the oxidation-reduction potential (ORP) of the volume (3v) of liquid, or the hydrogen potential (pH) of the volume (3v) of liquid.

* * * * *